US012589501B2

(12) United States Patent
Isoda et al.

(10) Patent No.: US 12,589,501 B2
(45) Date of Patent: Mar. 31, 2026

(54) DOOR OPENING AND CLOSING ROBOT AND METHOD OF OPENING AND CLOSING DOOR USING THE SAME

(71) Applicants: KAWASAKI JUKOGYO KABUSHIKI KAISHA, Kobe (JP); Kawasaki Robotics (USA), INC., Wixom, MI (US)

(72) Inventors: Hideki Isoda, Kobe (JP); Kenichi Miyazaki, Kobe (JP); Shusaku Yamaguchi, Novi, MI (US)

(73) Assignees: KAWASAKI JUKOGYO KABUSHIKI KAISHA, Kobe (JP); Kawasaki Robotics (USA), INC., Wixom, MI (US)

( * ) Notice: Subject to any disclaimer, the term of this patent is extended or adjusted under 35 U.S.C. 154(b) by 405 days.

(21) Appl. No.: 18/177,887

(22) Filed: Mar. 3, 2023

(65) Prior Publication Data

US 2024/0293937 A1 Sep. 5, 2024

(51) Int. Cl.
| *B25J 9/16* | (2006.01) |
| *B25J 9/12* | (2006.01) |
| *B25J 15/00* | (2006.01) |
| *B25J 18/04* | (2006.01) |
| *B25J 11/00* | (2006.01) |

(52) U.S. Cl.
CPC ............. *B25J 9/1694* (2013.01); *B25J 9/126* (2013.01); *B25J 9/1612* (2013.01); *B25J 9/1679* (2013.01); *B25J 15/0019* (2013.01); *B25J 18/04* (2013.01); *B25J 11/0075* (2013.01)

(58) Field of Classification Search
CPC ........ B25J 9/126; B25J 9/1612; B25J 9/1679; B25J 9/1694; B25J 11/0075; B25J 13/085; B25J 15/0019; B25J 18/04
See application file for complete search history.

(56) References Cited

U.S. PATENT DOCUMENTS

| 2010/0030381 A1* | 2/2010 | Clifford .............. B05B 13/0452 |
| | | 901/49 |
| 2011/0022228 A1* | 1/2011 | Mikurube .............. B62D 65/06 |
| | | 700/248 |
| 2012/0163948 A1* | 6/2012 | Asamizu ................ B25J 9/0087 |
| | | 414/590 |
| 2013/0034660 A1* | 2/2013 | Koyanagi ........... B05B 13/0452 |
| | | 118/620 |
| 2017/0266808 A1* | 9/2017 | Alonso .................. B25J 9/1612 |
| 2018/0169690 A1* | 6/2018 | Yoshino ................ B25J 9/0084 |

(Continued)

FOREIGN PATENT DOCUMENTS

| JP | 2013-031890 A | 2/2013 |
| JP | 6814909 A | 1/2021 |

(Continued)

*Primary Examiner* — Dale Moyer

(74) *Attorney, Agent, or Firm* — METROLEX IP LAW GROUP, PLLC; Robert L. Scott, Esq.

(57) ABSTRACT

A door opening and closing robot according to one or more embodiments may include a base; a robot arm connected to the base that includes an arm that is rotatable and a motor that rotates the arm; and a door operating tool that is connected to the robot arm and moves with a rotation of the arm. The robot arm drives the motor to rotate the door operating tool and detects presence of the door based on a change in torque of the motor.

15 Claims, 10 Drawing Sheets

(56) References Cited

U.S. PATENT DOCUMENTS

| | | | | |
|---|---|---|---|---|
| 2022/0241809 A1* | 8/2022 | Yamaguchi | ............. | B05B 16/40 |
| 2024/0066696 A1* | 2/2024 | Fujisawa | ................ | B25J 9/0087 |
| 2024/0091928 A1* | 3/2024 | Kawata | ................. | B25J 9/1025 |

FOREIGN PATENT DOCUMENTS

| | | | |
|---|---|---|---|
| JP | 2022-115552 A | 8/2022 |
| WO | 2020-096025 A | 5/2020 |

* cited by examiner

FIG. 1

DOOR OPENING AND CLOSING ROBOT AND METHOD OF OPENING AND CLOSING DOOR USING THE SAME

BACKGROUND

The present disclosure relates to a door opening/closing robot installed in an automobile body coating line and a door opening/closing method using the door opening/closing robot.

For example, in the automotive assembly industry, it is sometimes necessary to open and close a door on an automobile body during an assembly process or a coating process. A coating operation of an automobile body is performed by a coating robot. When coating around a door of an automobile body automatically using a coating robot, it is necessary to open and close the door in order to coat the back side of the door. Opening and closing a door is done by a coating robot that also has a door opening and closing function or by a door opening and closing robot installed alongside the coating robot.

Japanese Published Patent JP-2013-31890 (Koyanagi) discloses a coating system capable of coating the interior part of a door without using a traveling device. In particular, Koyanagi discloses a robot for opening and closing a door that includes a conveyor, which conveys an automobile body, a coating robot, which is fixedly installed at a first height position and coats at least the interior of a door of the automobile body by changing its posture to follow the conveying motion of the automobile body by the conveyor, and a door opening/closing robot, which is fixedly installed at a second height position different from the first height position, constituted so that its working range can overlap with that of the coating robot, and opens and closes a door of an automobile body and keeps the door open by changing its posture to follow the conveying motion of the automobile body by the conveyor.

SUMMARY

A door opening and closing robot according to one or more embodiments may include a base; a robot arm connected to the base including an arm that is rotatable; a driver that rotates the arm; and a door operating tool that is connected to the robot arm and moves as the arm rotates. The robot arm may drive the driver to rotate the door operating tool and detect the presence of the door based on a change in the torque of the motor.

A method of opening and closing a door using a door opening and closing robot according to one or more embodiments may include a robot arm of the door opening and closing robot reacting to receiving a door opening instruction and moving to an open position of the door; a door operating tool that is connected to the robot arm being rotated by a motor pertaining to the door operating tool; detecting a change in torque of the motor; recognizing the presence of the door when the change in torque is detected; and performing a door opening operation in response to the recognition of the presence of the door.

BRIEF DESCRIPTION OF DRAWINGS

FIG. 1 is a perspective view illustrating a door opening/closing robot according to one or more embodiments;

DETAILED DESCRIPTION

Figure 2:
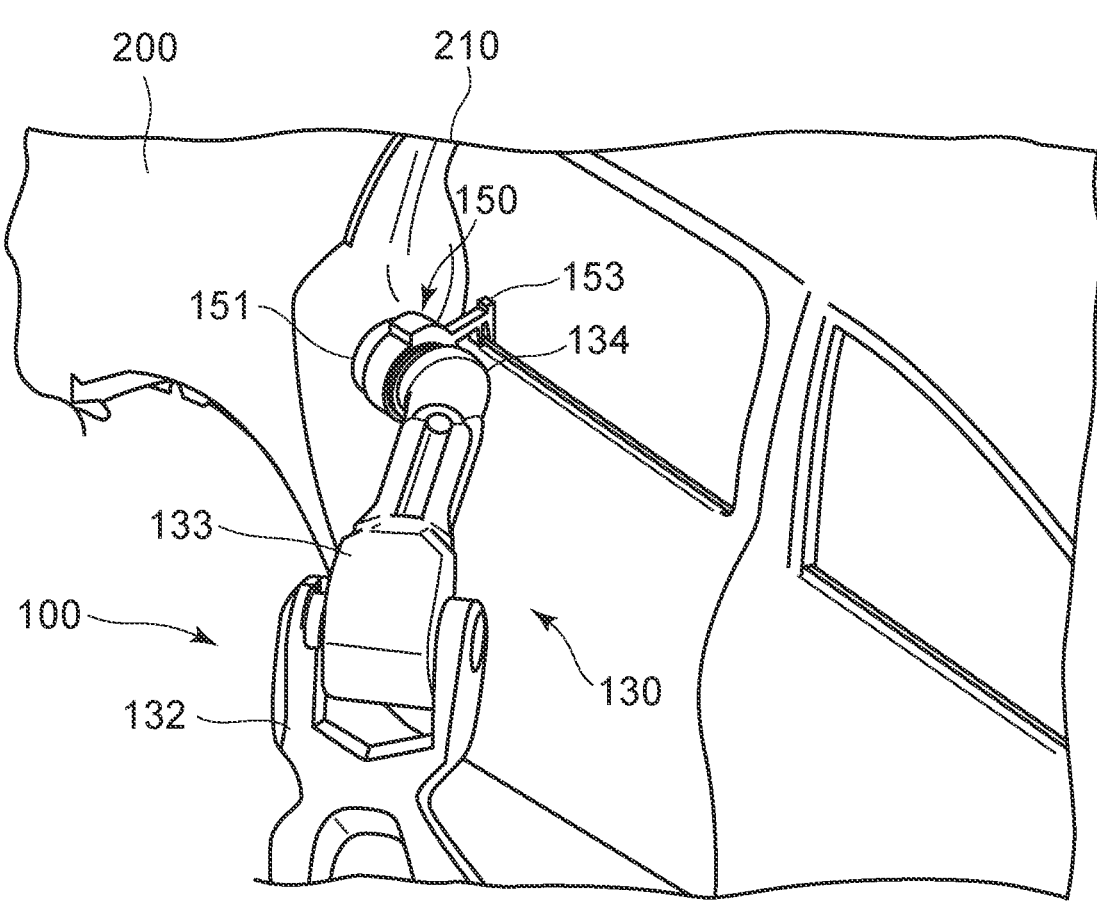
FIG. 2 is a diagram illustrating a state in which the door opening/closing robot according to one or more embodiments opens and closes a door of a car.

A door opening/closing robot according to one or more embodiments and a method of opening/closing a door using the door opening/closing robot is described in detail with reference to the drawings. In the description of the drawings, identical or similar parts may be indicated by identical or similar symbols. The descriptions in the drawings are schematic, and the relationship between thickness and dimensions, and the ratio of length, thickness, etc. of each part are examples, and do not limit the technical concept of the invention. The relationship between dimensions and the ratio of dimensions may differ among the drawings. In the following explanations, when describing the positional relationship of each component, "top," "bottom," "right side," "left side," etc. are used as appropriate based on the orientation of the drawing to which reference is made, but these indications do not limit the technical concept of the invention. Expressions such as "top," "bottom," "right side," and "left side" may be used even when the parts are not touching. "Lengthwise direction" may mean the direction of a long side on the main surface of a member. "Width direction" may mean the direction of a short side of the main surface of the member. The "height direction" and "vertical direction" may mean the direction pertaining to the thickness of the main surface of the member.

Figure 1:
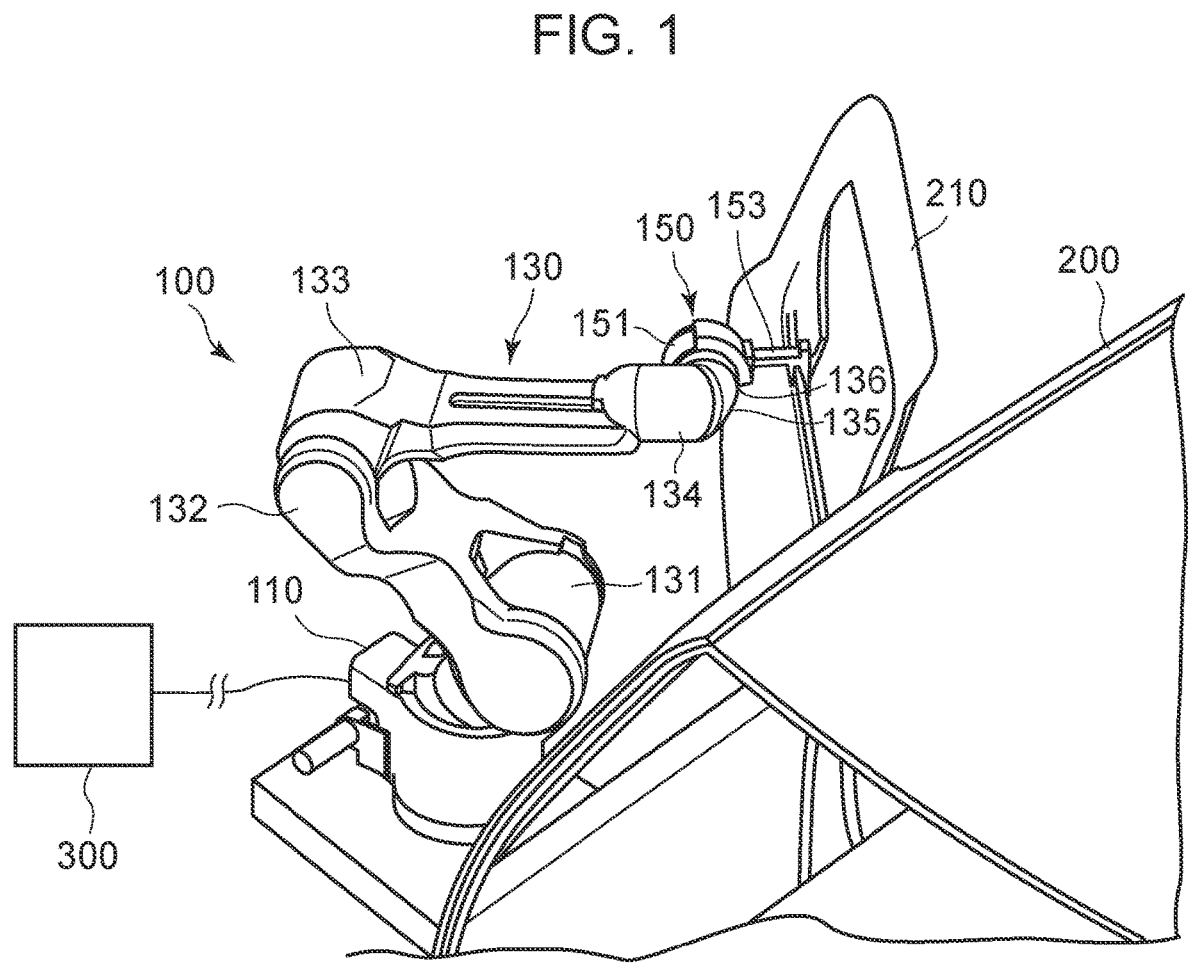

FIG. 1 is a perspective view illustrating a door opening/closing robot 100 according to one or more embodiments. FIG. 1 illustrates, in particular, a state in which a door 210 of an automobile body 200 is opened. The embodiment illustrated in FIG. 1 particularly describes an example of an opening/closing robot used in a coating line of the automobile body 200. However, the door opening/closing robot according to one or more embodiments is not limited to an automobile body coating line, but can be applied to any technique for opening and closing a door using a robot. As illustrated in FIG. 1, the automobile body 200 is transported by a conveyor system. The door opening/closing robot 100 is provided in a position to open/close the door 210 of the automobile body 200. In the coating line, a coating robot, which is not illustrated in the figure, may be provided, and the automobile body 200 may be coated by a paint spurting from a coating gun mounted on the coating robot.

The door opening/closing robot 100 includes a base 110, a robot arm 130 that is movably connected to the base 110, and a door operating tool 150 that is movably connected to the robot arm 130. The base 110 may be fixedly installed on a floor where the door opening/closing robot 100 is installed. The base 110 may be mounted on a cart traveling on a rail that runs parallel to the conveyor system. The robot arm 130 includes a first link 131 that is movably connected to the base 110, a second link 132 that is movably connected to the first link 131, a third link 133 that is movably connected to the second link 132, a fourth link 134 that is movably connected to the third link 133, a fifth link 135 that is movably connected to the fourth link 134, and a sixth link 136 that is movably connected to the fifth link 135. Here, the term movable includes an ability to freely move in a circling movement, back and forth movement, rotating movement, up and down movement, bending movement, or twisting movement. The first link 131 may be connected to the base 110 and move around a rotation axis of the first link 131. The second link 132 may be connected to the first link 131 and move around the rotation axis of the second link 132. The third link 133 may be connected to the second link 132 and move around the rotation axis of the third link 133. The fourth link 134 may be connected to the third link 133 and move around the rotation axis of the fourth link 134. The fifth link 135 may be connected to the fourth link 134 and move around the rotation axis of the fifth link 135. The sixth link 136 may be connected to the fifth link 135 and move around the rotation axis of the sixth link 136. The door operating tool 150 includes a tool adapter 151 that is connected to the sixth link 136 and a tool 153 that is connected to the tool adapter 151. The door operating tool 150 is connected to an end of the sixth link 136. The door operating tool 150 moves in response to rotation of the sixth link 136.

The robot arm 130 according to one or more embodiments illustrated in FIG. 1 is a 6-axis vertically articulated robot arm with six arms moving around their respective rotation axes, but is not limited to this. A robot arm according to one or more embodiments may be a vertically articulated robot arm with 2-axis, 3-axis, 4-axis, 5-axis, 7-axis, 8-axis, 9-axis, 10-axis, etc. A robot arm according to one or more embodiments may be a horizontal articulated robot arm with 2-axis, 3-axis, 4-axis, 5-axis, 6-axis, 7-axis, 8-axis, 9-axis, 10-axis, etc.

The door opening/closing robot 100 receives a control signal from a controller 300 and operates the robot arm 130 based on the control signal of the controller 300. The controller 300, while sending a control signal to the door opening/closing robot 100 and controlling a position of the door operating tool 150, opens and closes the door 210 using the door operating tool 150. Specifically, the controller 300 sends a control signal to the door opening/closing robot 100. Upon receiving the control signal, the door opening/closing robot 100 performs a position control by rotating the first link 131, second link 132, third link 133, fourth link 134, fifth link 135, and sixth link 136 in the robot arm 130. The robot arm 130 is connected to a driver that conducts a movement of the first link 131, second link 132, third link 133, fourth link 134, fifth link 135, and sixth link 136. The driver includes a motor that rotates the first link 131, second link 132, third link 133, fourth link 134, fifth link 135, and sixth link 136. The driver is not limited to this and includes, for example, an oil pressure driver and an air pressure driver in addition to a motor. The controller 300 controls the opening and closing of the door 210 using the door operating tool 150 while controlling the position of the door operating tool 150. Also, the controller 300 obtains various information from the door opening/closing robot 100. The information obtained from the door opening/closing robot 100 includes torque values of motors that operate each arm. In FIG. 1, the controller 300 is provided near the door opening/closing robot 100, but it is not limited to this. For example, the controller 300 can be outside a coating line or outside a factory where the coating line is installed. The controller 300 needs only to be able to send a control signal to the door opening/closing robot 100, for example, via the internet.

The controller 300 may include a computer including, for example, a processor such as a CPU (Central Processing Unit), etc., and the computer reads a computer program stored on a recording medium and cooperates with the computer program to perform various control operations of the door opening/closing robot. For the recording medium, "a non-transitory tangible computer-readable storage medium (a non-transitory tangible computer-readable storage medium)," such as a computer-readable ROM (Read Only Memory), etc., a tape, disk, card, semiconductor memory, programmable logic circuit, etc. may be used. Also, the computer may further be provided with RAM (Random Access Memory), etc. to expand the above program. The above program may be supplied to the above computer via any transmission medium (communication network, broadcast wave, etc.) capable of transmitting the program. Also, the above program may be realized in the form of a data signal embedded in a carrier wave, which is embodied by electronic transmission.

FIG. 2 is a perspective view illustrating the door opening/closing robot 100 according to one or more embodiments. In particular, FIG. 2 illustrates a state in which the door 210 of the automobile body 200 is closed by the door opening/closing robot 100. The door opening/closing robot 100 is controlled by a controller and closes the door 210 of the automobile body 200 using the door operating tool 150 that is connected to an end of the robot arm 130.

Figure 3:
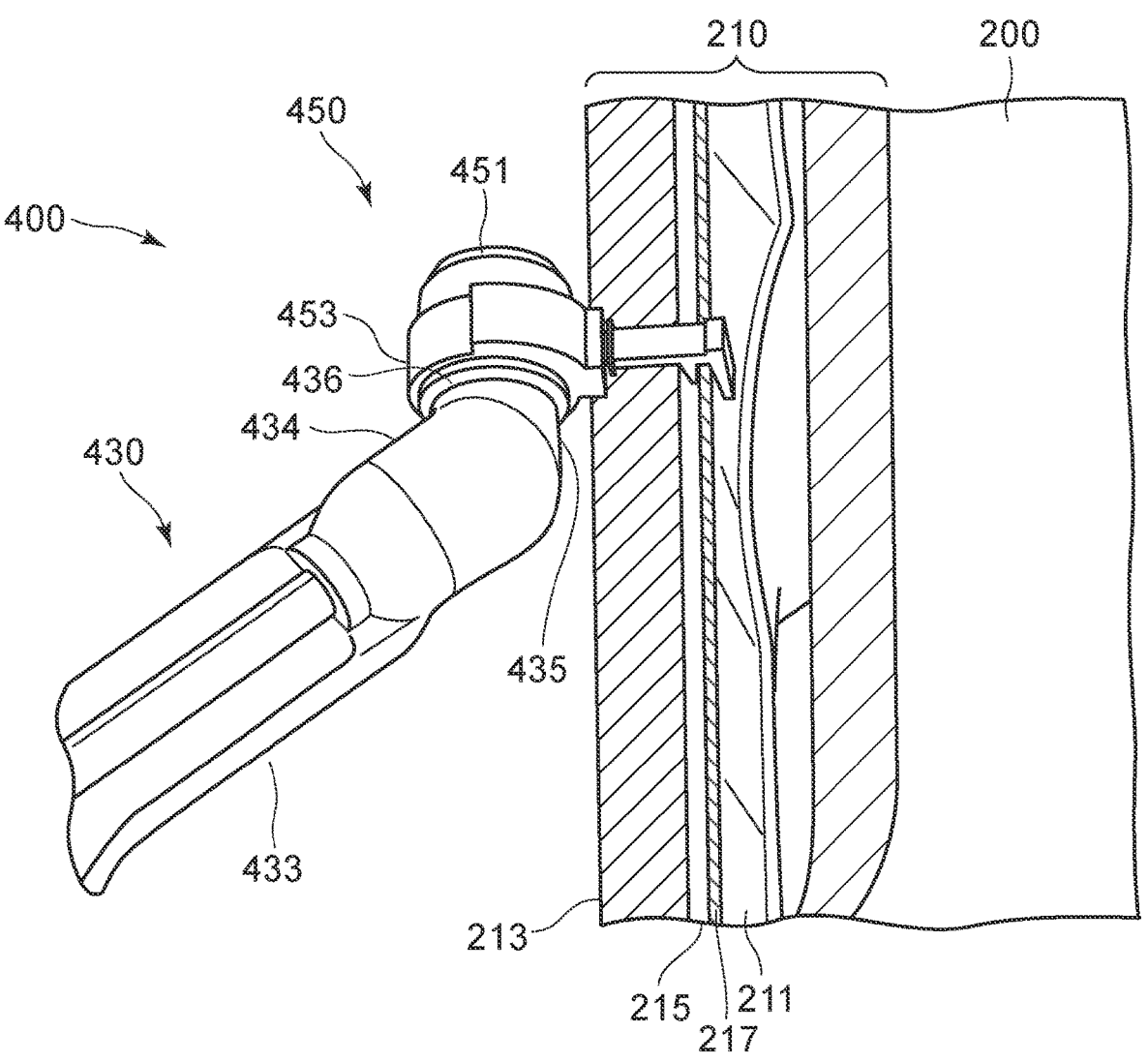
FIG. 3 is a diagram illustrating a state in which a door operating tool of a door opening/closing robot according to one or more embodiments is in contact with a door.

FIG. 3 is a diagram illustrating a door opening/closing robot 400 according to one or more embodiments. For convenience of explanation, FIG. 3 illustrates a view of the automobile body 200 from above. The door opening/closing robot 400 includes a robot arm 430. The robot arm 430 includes a third link 433 that is movably connected, a fourth link 434 that is movably connected to the third link 433, a fifth link 435 that is movably connected to the fourth link 434, and a sixth link 436 that is movably connected to the fifth link 435. The third link 433 may be connected to other links connected to a base and move around a rotation axis of the third link 433. Without limitation, the third link 433 may be connected to the base and move around the rotation axis of the third link 433. Also, the third link 433 may be connected to other links that are not directly connected to the base and move around the rotation axis of the third link 433. The fourth link 434 may be connected to the third link 433 and move around the rotation axis of the fourth link 434. The fifth link 435 may be connected to the fourth link 434 and move around the rotation axis of the fifth link 435. The sixth link 436 may be connected to the fifth link 435 and move around the rotation axis of the sixth link 436. A door operating tool 450 includes a tool adapter 451 that is connected to the sixth link 436 and a tool 453 that is connected to the tool adapter 451. The door operating tool 450 is connected to an end of the sixth link 436.

The door opening/closing robot 400 receives a control signal from a controller and operates the robot arm 430. The controller, while sending a control signal to the door opening/closing robot 400 and controlling a position of the door operating tool 450, opens and closes the door 210 using the door operating tool 450. As illustrated in FIG. 3, the door 210 of the automobile body 200 has an inner panel 211, which is an inner door panel of the automobile body 200, and an outer panel 213, which is an outer door panel of the automobile body 200. Between the inner panel 211 and the outer panel 213 is a window groove 215 into which a window glass is inserted. The window groove 215 is a slit opening toward a top of the automobile body 200. The inner panel 211 has a contact portion 217 to open and close the door 210 by contacting the door operating tool 450. The door opening/closing robot 400 opens and closes the door 210 by bringing the tool 450 into contact with the contact portion 217 and controlling the robot arm 430.

In FIG. 3, for convenience of explanation, only a part of the door opening/closing robot 400, especially a tip of the robot arm 430, is illustrated. Configurations of the door opening/closing robot 400 and the robot arm 430 may, for example, have the same or approximate configuration as the door opening/closing robot 100 illustrated in FIG. 1 and FIG. 2.

Figure 4:
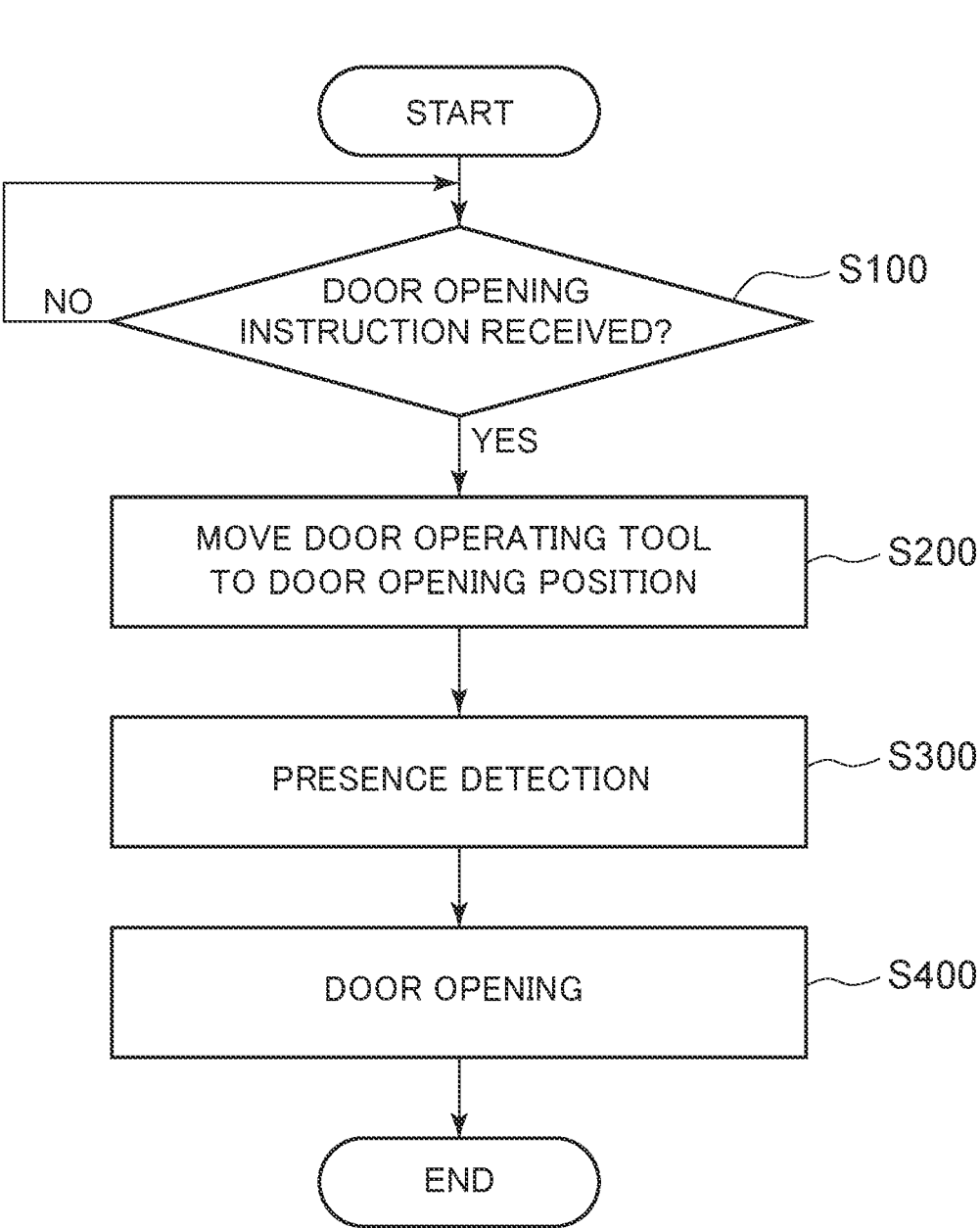
FIG. 4 is a flowchart illustrating a method of opening and closing a door of an automobile body using the door opening/closing robot according to one or more embodiments.

FIG. 4 is a flowchart illustrating a method of opening and closing a door of an automobile body using a door opening/closing robot according to one or more embodiments. A system that controls a process performed by a group of robots including the door opening/closing robot according to one or more embodiments starts a program to control an operation of the group of these robots. The system that controls a process performed by a group of robots includes a stage control panel. The stage control panel controls an operation of each robot in the group of robots. The process to be performed by the group of robots includes a coating process of an automobile body. In the group of robots, for example, for a coating process of an automobile body, a door opening/closing robot and a coating robot are included. The door opening/closing robot according to one or more embodiments receives a motion control instruction from a system that controls a process performed by the group of robots. In this case, in order to avoid a collision, etc. with other robots, an interlock control may be performed between robots that may cause interference. For example, the door opening/closing robot according to one or more embodiments may perform an interlock control with the coating robot to avoid a collision, etc. with the coating robot. Specifically, when the door opening/closing robot according to one or more embodiments performs an operation, the coating robot may avoid moving in an operating range of the door opening/closing robot. The door opening/closing robot determines whether a door opening instruction is received from the controller (step S100). When the door opening/closing robot receives the door opening instruction, then, the door opening/closing robot moves the robot arm of the door opening/closing robot to move the door operating tool to a door opening position (step S200). For example, the door opening/closing robot moves the robot arm to move the door operating tool attached to the tip of the robot arm to the vicinity of the contact portion of the door. Next, a presence detection operation is performed (step S300). The presence detection operation detects whether the door is in a correct position for the door operating tool. Specifically, the robot arm of the door opening/closing robot may be rotated, and the torque required during the rotation may be detected. The robot arm may have multiple rotation axes, and the detection of the torque required for rotation of the rotation axes pertaining to the tip of the arm may be performed. For example, when the arm has six axes, detection of the torque required for rotation of the sixth axis pertaining to the tip of the arm may be performed. The detection of the torque may be used to detect the presence of the door. When the presence of the door is confirmed, then, a door opening operation is performed (step S400). In this way, using the door opening/closing robot, the door of the automobile body is opened. Thereafter, the robot proceeds to the next process, for example, the coating process of the automobile body.

Figure 5:
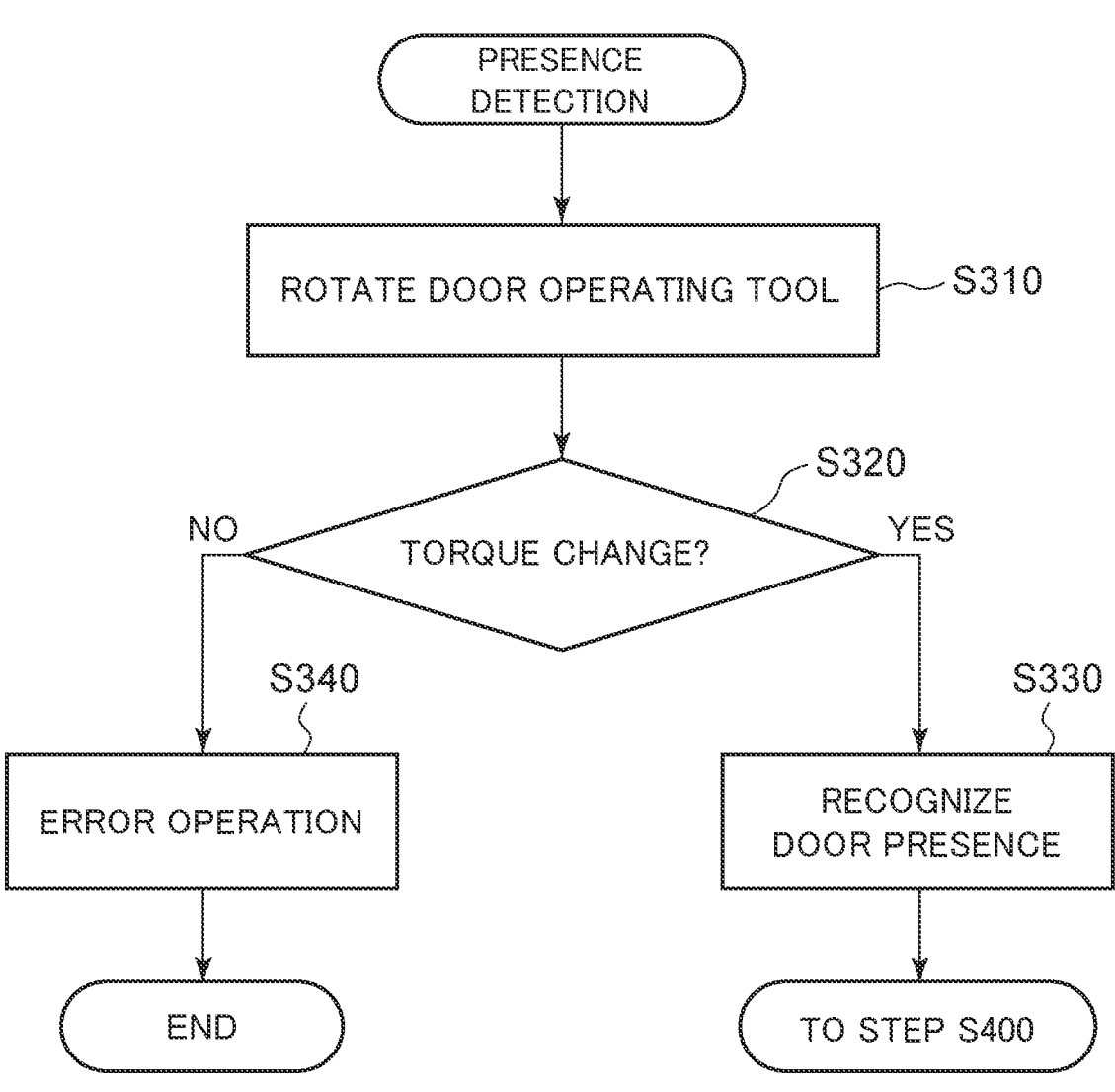
FIG. 5 is a flowchart illustrating a presence detection operation.

FIG. 5 is a flowchart illustrating a presence detection operation according to one or more embodiments. As a precondition, it is assumed that the operation of step S200 illustrated in FIG. 4, i.e., the operation that moves the door operating tool of the door opening/closing robot to the door opening position, is completed. First, the door operating tool is rotated (step S310). This rotation of the door operating tool is performed, for example, by controlling the robot arm connected to the door operating tool and controlling a motor of a joint of the robot arm to rotate the door operating tool. Specifically, for example, in FIG. 3, by rotating the sixth link 436, the door operating tool 450 connected to the sixth link 436 is rotated. This causes the tip of the tool 453 to move near the contact portion 217 of the door 210 of the automobile body 200.

Next, a change in torque is detected (step S320). At step S310, the door operating tool 450 is rotated and moved to a position where the door operating tool 450 and the contact portion 217 of the door 210 are about to contact. This position is designated as a teaching point A. The torque to rotate the door operating tool 450 at this point is designated as a torque A. Next, the door operating tool 450 is further rotated from the teaching point A to bring the door operating tool 450 into contact with the contact portion 217 of the door 210. After contacting the door operating tool 450 with the contact portion 217 of the door 210, the door operating tool 450 is further rotated by a predetermined angle. This position is designated as a teaching point B. At the teaching point B, the door operating tool 450 and the door 210 contact at the contact portion 217, and a force such that the door operating tool 450 pushes the door 210 is needed. As a result, a current value of the motor pertaining to the door operating tool 450 increases, and a restraining torque of the motor increases. The torque to rotate the door operating tool 450 at this point is designated as a torque B. As described above, the presence of the door 210 can be detected by detecting the torque pertaining to the position where the door operating tool 450 and the contact portion 217 of the door 210 are about to contact (torque A) and the torque pertaining to the position where the door operating tool 450 is further rotated by a predetermined angle after the door operating tool 450 is in contact with the contact portion 217 of the door 210 (torque B), and by detecting a change between these torque A and torque B. The change between the torque A and the torque B can be detected, for example, by taking a difference between the two torques. The change in torque can be detected, for example, by a change in the current value of the motor pertaining to the door operating tool 450. When the change in torque is detected in this way, the door 210 is recognized as being present (step S330), and the process proceeds to the step S400, which is the next step. On the other hand, when the door operating tool 450 and the door 210 are not in contact at the teaching point B, i.e., the door 210 is not seated in place and the door 210 cannot be opened by the door operating tool 450, the force such that the door operating tool 450 pushes the door 210 is not required and the torque A and the torque B do not change. Therefore, the current value of the motor pertaining to the door operating tool 450 does not change. When no change in torque is detected, an error operation is performed as the door 210 is not present (step S340).

Figure 6:
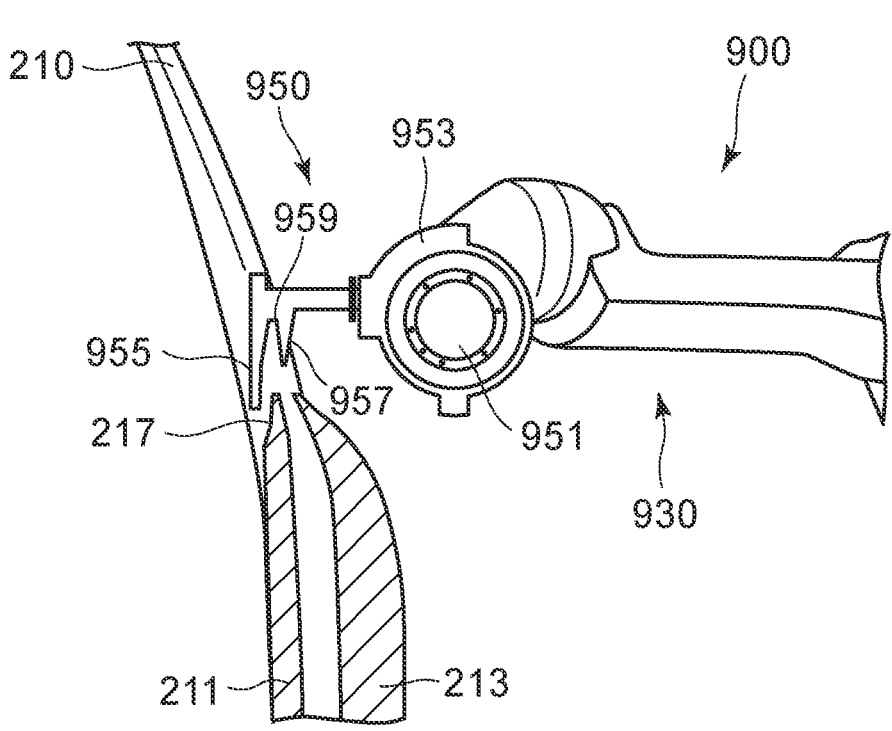
FIG. 6 and FIG. 7 are diagrams illustrating operations of the door opening/closing robot according to one or more embodiments.
Figure 7:
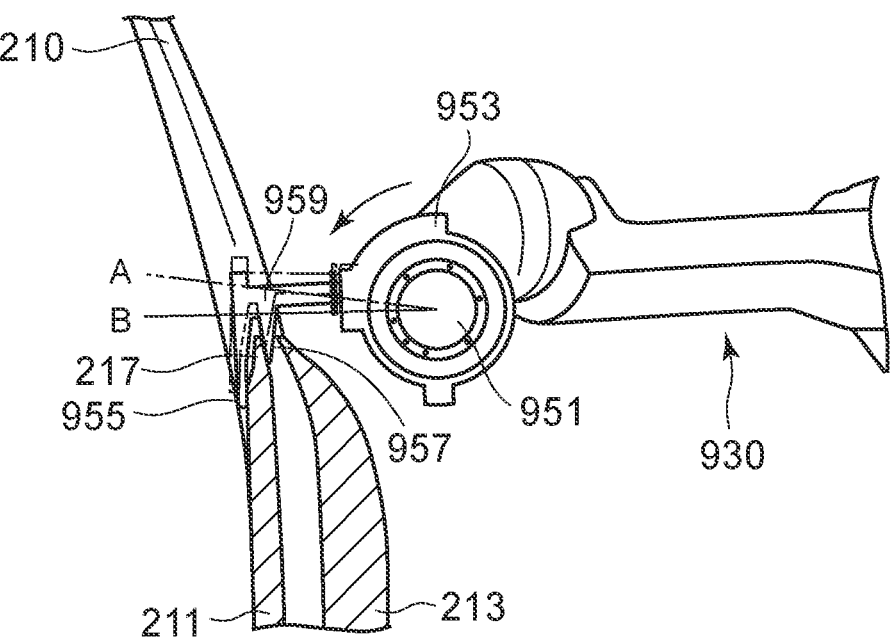

FIG. 6 and FIG. 7 are diagrams illustrating a door presence detection from an operation of the door opening/ closing robot according to one or more embodiments. In FIG. 6, first, when a door opening/closing robot 900 receives an instruction of opening a door from a controller, the door opening/closing robot 900 moves a robot arm 930 to move a door operating tool 950 near the contact portion 217 of the door 210. The door operating tool 950 includes a tool adapter 951 that is rotatable by the robot arm 930 and a tool 953 that rotates as the tool adapter 951 rotates. For example, the door opening/closing robot 900 moves the robot arm 930 to move the door operating tool 950, which is attached to a tip of the robot arm 930, to the vicinity of the contact portion 217 of the door 210. At this time, a first projection portion 955 and a second projection portion 957 of the tool 953 are provided in a position where they can pinch the contact portion 217 of the door 210. Next, to perform a presence detection operation, in FIG. 7, the door operating tool 950 is rotated and moved to a position where the door operating tool 950 and the contact portion 217 of the door 210 are about to contact. This position is designated as a teaching point A. Next, the door operating tool 950 is further rotated from the teaching point A to bring the door operating tool 950 into contact with the contact portion 217 of the door 210. Specifically, after the first projection portion 955 and the second projection portion 957 of the tool 953 pinch the contact portion 217 of the door 210 and the first projection portion 955, a concave portion 959, or the second projection portion 957 contacts the contact portion 217 of the door 210, the door operating tool 950 is further rotated by a predetermined angle. This position is designated as a teaching point B. At the teaching point B, the door operating tool 950 and the contact portion 217 of the door 210 contact each other, and a force such that the door operating tool 950 pushes the door 210 is needed. As a result, a current value of a motor pertaining to the door operating tool 950 increases, and a restraining torque of the motor increases. Next, when a change in torque is detected, the door 210 is recognized as being present. When detecting a change in torque, the torque of one or more motors that move or rotate the robot arm 930 may be detected. Also, when detecting a change in torque, only a torque change of a motor pertaining to the door operating tool 950 may be detected. Also, after the first projection portion 955 and the second projection portion 957 of the tool 953 pinch the contact portion 217 of the door 210 and the concave portion 959 contacts the contact portion 217 of the door 210, the door operating tool 950 may be further rotated by a predetermined angle. In this way, it can be detected that the contact portion 217 of the door 210 is firmly and deeply inserted between the first projection portion 955 and the second projection portion 957. In this way, it can be detected that the door opening/closing robot 900 can firmly open and close the door 210. Also, after the first projection portion 955 and the second projection portion 957 of the tool 953 pinch the contact portion 217 of the door 210 and the concave portion 959 contacts the contact portion 217 of the door 210, by further rotating the door operating tool 950 by a predetermined angle, detection sensitivity is improved for a change in torque.

By detecting only a torque change of a motor pertaining to the door operating tool 950, the number of motors to detect the torque change may be reduced, and thus the wiring for detecting the torque change may be reduced. Here, a motor pertaining to the door operating tool 950 is a motor that rotates each link of a robot arm when the door operating tool 950 moves for presence detection, and may be, for example, a motor that rotates a link at a top end part of the robot arm. Specifically, in the case of the robot arm 430 illustrated in FIG. 3, it may be a motor that rotates the sixth link 436 to which the door operating tool 450 is connected.

Figure 8:
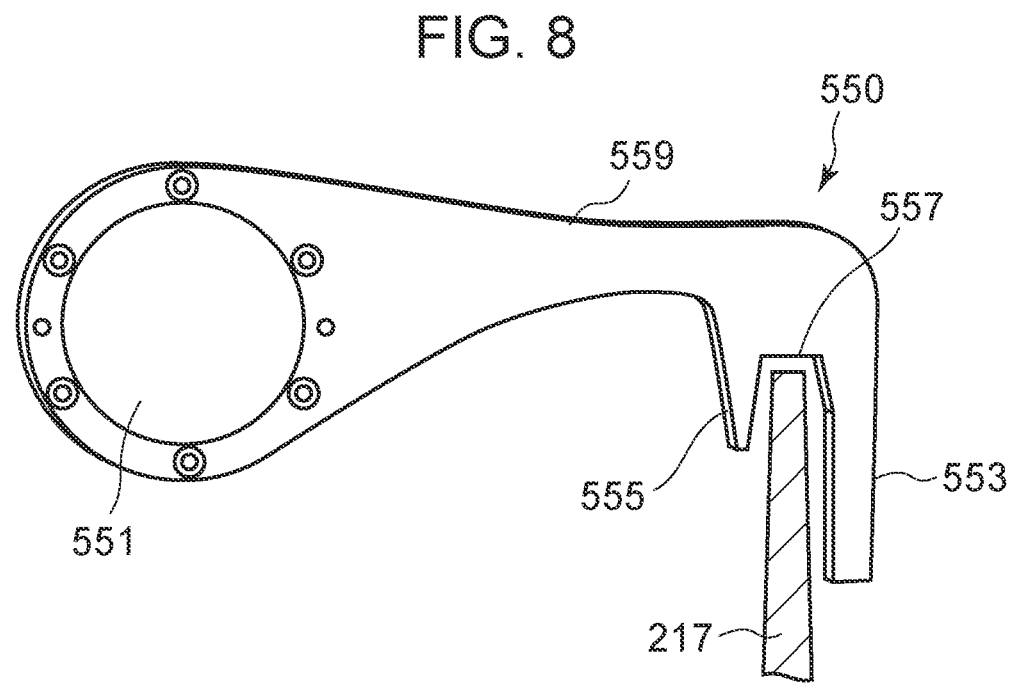
FIG. 8, FIG. 9, FIG. 10, and FIG. 11 are diagrams each illustrating a door operating tool according to one or more embodiments.

FIG. 8 is a diagram illustrating a door operating tool 550 according to one or more embodiments. The door operating tool 550 has an arm connection portion 551 to connect to a robot arm, a first projection portion 553 that is provided at a predetermined distance from the arm connection portion 551, a second projection portion 555 that is provided at a predetermined distance from the first projection portion 553, a concave portion 557 that is provided between the first projection portion 553 and the second projection portion 555, and a tool arm 559 to provide a predetermined distance between the first projection portion 553, the second projection portion 555, and the concave portion 557 and the arm connection portion 551. The door operating tool 550 has the tool arm 559 extending in a direction perpendicular to a flange surface, which is a joint surface of the arm connection portion 551. In this way, a force can be applied efficiently to the door operating tool 550 when the robot arm rotates. The door operating tool 550 rotates with a tool adapter and contacts the contact portion 217 of an inner panel. For example, the concave portion 557 provided between the first projection portion 553 and the second projection portion 555 may contact the contact portion 217. In other words, the contact portion 217 may be sandwiched between the first projection portion 553 and the second projection portion 555 so that the concave portion 557 may contact the contact portion 217. Also, the first projection portion 553 extends longer from the tool arm 559 than the second projection portion 555. In this way, the contact portion 217 of the door 210 can be surely welcomed between the first projection portion 553 and the second projection portion 555. Also, the second projection portion 555 has a tapered shape toward the tip. In this way, the contact portion 217 of the door 210 can be surely welcomed between the first projection portion 553 and the second projection portion 555. A material of the door operating tool 550 illustrated in FIG. 8 may be a so-called engineering plastic or a resin-based material, for example, polyacetal (POM). POM has excellent abrasion resistance and can also reduce a scratch on an object such as an automobile body, etc. Also, POM has high rigidity and toughness, and excellent chemical resistance and solvent resistance. Also, with respect to a dimension of the door operating tool 550 illustrated in FIG. 8, a distance from a center of the arm connection portion 551 to a center of the concave portion 557 may be 100 mm to 500 mm, and especially considering operability and avoidance of interference with other robots, the distance may be 150 mm to 400 mm, and may be even 200 mm to 250 mm. Also, a distance from the concave portion 557 to a tip of the first projection portion 553 may be 20 mm to 200 mm, especially may be 40 mm to 150 mm.

Figure 9:
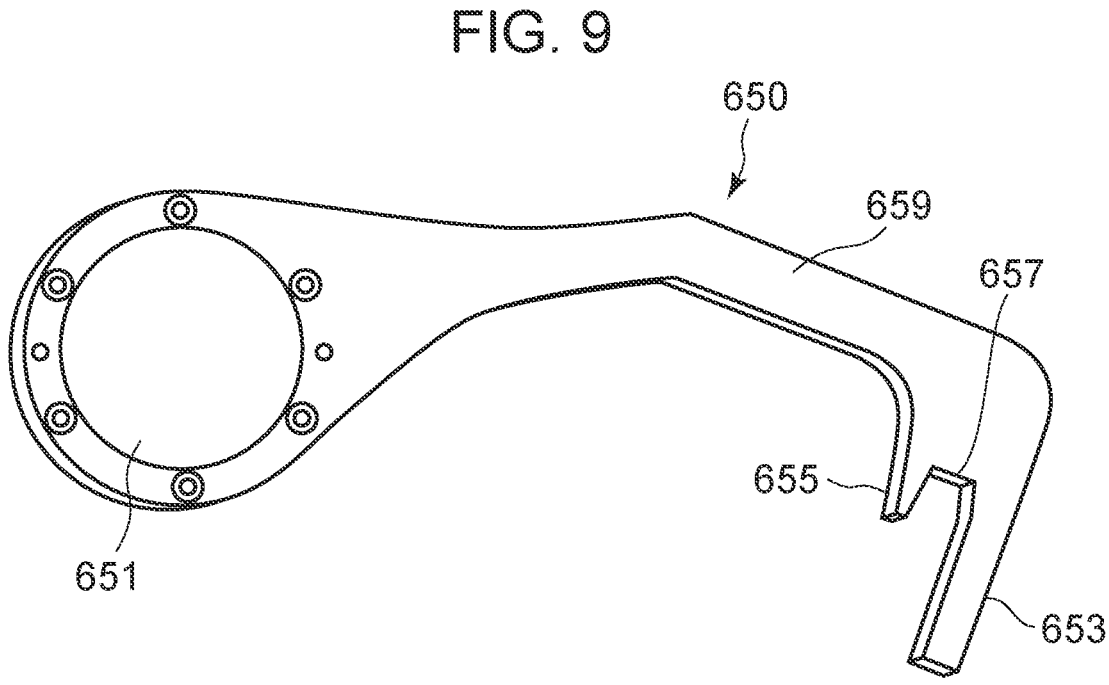

FIG. 9 is a diagram illustrating a door operating tool 650 according to one or more embodiments. The door operating tool 650 has an arm connection portion 651 to connect to a robot arm, a first projection portion 653 that is provided at a predetermined distance from the arm connection portion 651, a second projection portion 655 that is provided at a predetermined distance from the first projection portion 653, a concave portion 657 that is provided between the first projection portion 653 and the second projection portion 655, and a tool arm 659 to provide a predetermined distance between the first projection portion 653, the second projection portion 655, and the concave portion 657 and the arm connection portion 651. The door operating tool 650 illustrated in FIG. 9 has a shape in which the tool arm 659 extending from the arm connection portion 651 is bent in a direction, in which the first projection portion 653 and the second projection portion 655 extend from the middle of the tool arm 659. Such a structure can accommodate the opening and closing of automobile doors of various shapes. In particular, the shape of the door operating tool 650 illustrated in FIG. 9 can reduce interference with an outer panel of a door. Also, the first projection portion 653 extends longer from the tool arm 659 than the second projection portion 655. In this way, the contact portion 217 of the door 210 can be surely welcomed between the first projection portion 653 and the second projection portion 655. Also, the second projection portion 655 has a tapered shape toward the tip. In this way, the contact portion 217 of the door 210 can be surely welcomed between the first projection portion 653 and the second projection portion 655. A material of the door operating tool 650 illustrated in FIG. 9 may be a so-called engineering plastic or a resin-based material, for example, polyacetal (POM). Also, with respect to a dimension of the door operating tool 650 illustrated in FIG. 9, a distance from a center of the arm connection portion 651 to a center of the concave portion 657 may be 100 mm to 500 mm, and especially considering operability and avoidance of interference with other robots, the distance may be 150 mm to 400 mm, and may be even 200 mm to 250 mm. Also, a distance from the concave portion 657 to a tip of the first projection portion 653 may be 20 mm to 200 mm, especially may be 40 mm to 150 mm.

Figures 10, 11:
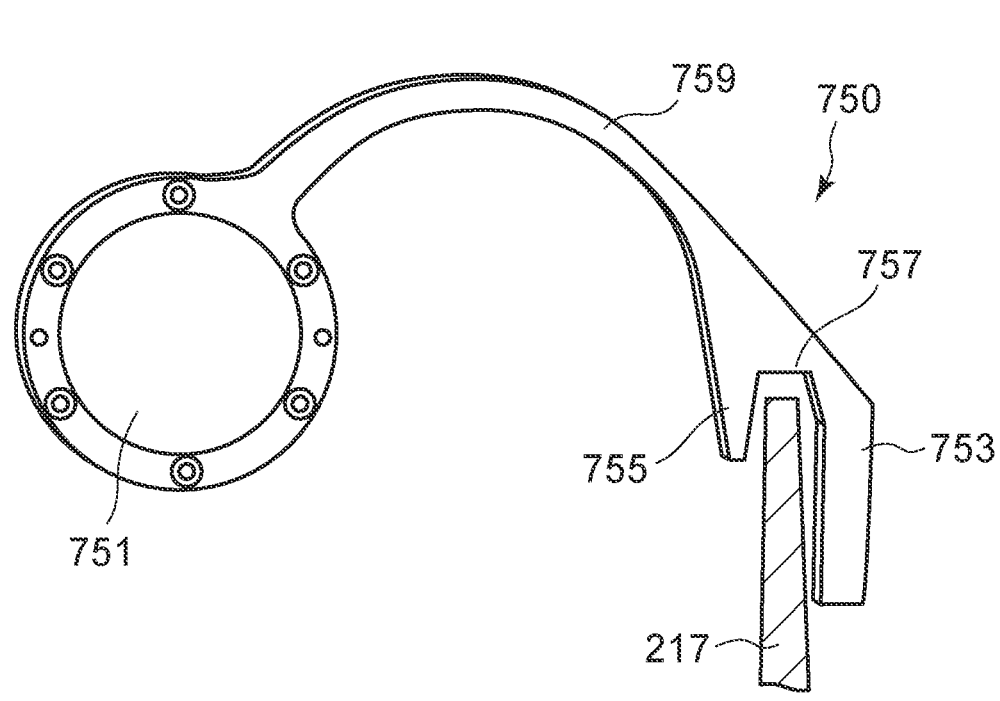

FIG. 10 is a diagram illustrating a door operating tool 750 according to one or more embodiments. The door operating tool 750 has an arm connection portion 751 to connect to a robot arm, a first projection portion 753 that is provided at a predetermined distance from the arm connection portion 751, a second projection portion 755 that is provided at a predetermined distance from the first projection portion 753, a concave portion 757 that is provided between the first projection portion 753 and the second projection portion 755, and a tool arm 759 to provide a predetermined distance between the first projection portion 753, the second projection portion 755, and the concave portion 757 and the arm connection portion 751. In the door operating tool 750 illustrated in FIG. 10, the tool arm 759 has an arc shape. Such a structure can accommodate the opening and closing of automobile doors of various shapes. In particular, the shape of the door operating tool 750 illustrated in FIG. 10 can reduce interference with an outer panel of a door. Furthermore, in the door operating tool 750 illustrated in FIG. 10, the tool arm 759 has an arc shape so that the tool arm 759 bends when a strong torque is applied to the door operating tool 750. The bending of the door operating tool 750 can reduce an impact on a door of a car. In addition, the bending of the door operating tool 750 can take a larger detection motion of a robot, which improves a range of detection and robustness. For example, due to variations in the height of a cart on which an automobile body is mounted, a height position of an automobile body may not be constant. Even in such a situation, a door operating tool according to one or more embodiments is rotated according to a rotation axis of a robot so that the door operating tool can reliably detect a door. For example, when a rotation axis of a tip of a robot has 6 axes, a set rotation angle is 2 degrees rotation of the rotation degree of the sixth axe. In this case, when the robot rotates 2 degrees or more, the robot may detect an abnormality. An item that may be detected as abnormal by the robot includes a deviation error, including an error in not reaching a target position, and a motor overload error. When a position of a height direction of the automobile body is not constant, there is a possibility of false detection of a deviation error or a motor overload error. Even in these situations, by the door operating tool 750 bending, a tolerance level of the set rotation angle can be increased. For example, by setting the set rotation angle to 5 degrees, a false detection of the door being present by the robot can be reduced, thereby improving a range of detection and robustness. Also, the first projection portion 753 extends longer from the tool arm 759 than the second projection portion 755. In this way, the contact portion 217 of the door 210 can be surely welcomed between the first projection portion 753 and the second projection portion 755. Also, the second projection portion 755 has a tapered shape toward the tip. In this way, the contact portion 217 of the door 210 can be surely welcomed between the first projection portion 753 and the second projection portion 755. A material of the door operating tool 750 illustrated in FIG. 10 may be a so-called engineering plastic or a resin-based material, for example, polyacetal (POM). Also, with respect to a dimension of the door operating tool 750 illustrated in FIG. 10, a distance from a center of the arm connection portion 751 to a center of the concave portion 757 may be 100 mm to 500 mm, especially considering operability and avoidance of interference with other robots, may be 150 mm to 400 mm, and may be even 200 mm to 250 mm. In addition, a distance from the concave portion 757 to a tip of the first projection portion 753 may be 20 mm to 200 mm, especially may be 40 mm to 150 mm.

FIG. 11 is a diagram illustrating a door operating tool 850 according to one or more embodiments. The door operating tool 850 has an arm connection portion 851 to connect to a robot arm, a first projection portion 853 that is provided at a predetermined distance from the arm connection portion 851, a second projection portion 855 that is provided at a predetermined distance from the first projection portion 853, a concave portion 857 that is provided between the first projection portion 853 and the second projection portion 855, and a tool arm 859 to provide a predetermined distance between the first projection portion 853, the second projection portion 855, and the concave portion 857 and the arm connection portion 851. In the door operating tool 850 illustrated in FIG. 11, the tool arm 859 has an arc shape. Also, the tool arm 859 has an arc shape from a connecting part of the arm connection portion 851 and has an arc shape that connects from the arc shape of the arm connection portion 851. The connecting part of the arm connection portion 851 and the tool arm 859 is thicker than the door operating tool 750 illustrated in FIG. 10. Such a structure can accommodate the opening and closing of automobile doors of various shapes. The shape of the door operating tool 850 illustrated in FIG. 11 can reduce interference with an outer panel of a door. Furthermore, in the door operating tool 850 illustrated in FIG. 11, the tool arm 859 has an arc shape so that the door operating tool 850 bends when a strong torque is applied to the door operating tool 850. The bending of the door operating tool 850 can reduce an impact on a door of an automobile body. In addition, the bending of the door operating tool 850 can take a larger detection motion of a robot, which improves a range of detection and robustness. Furthermore, having an arc shape from the connecting part of the arm connection portion 851 and having an arc shape that connects from the arc shape of the arm connection portion 851 can increase resistance to an external stress. Also, the first projection portion 853 extends longer from the tool arm 859 than the second projection portion 855. In this way, the contact portion 217 of the door 210 can be securely welcomed between the first projection portion 853 and the second projection portion 855. Also, the second projection portion 855 has a tapered shape toward the tip. In this way, the contact portion 217 of the door 210 can be surely welcomed between the first projection portion 853 and the second projection portion 855. A material of the door operating tool 850 illustrated in FIG. 11 may be a so-called engineering plastic or a resin-based material, for example, polyacetal (POM). Also, with respect to a dimension of the door operating tool 850 illustrated in FIG. 11, a distance from a center of the arm connection portion 851 to a center of the concave portion 857 may be 100 mm to 500 mm, especially considering operability and avoidance of interference with other robots, may be 150 mm to 400 mm, may be even 200 mm to 250 mm. In addition, a distance from the concave portion 857 to a tip of the first projection portion 853 may be 20 mm to 200 mm, especially may be 40 mm to 150 mm.

Figure 12:
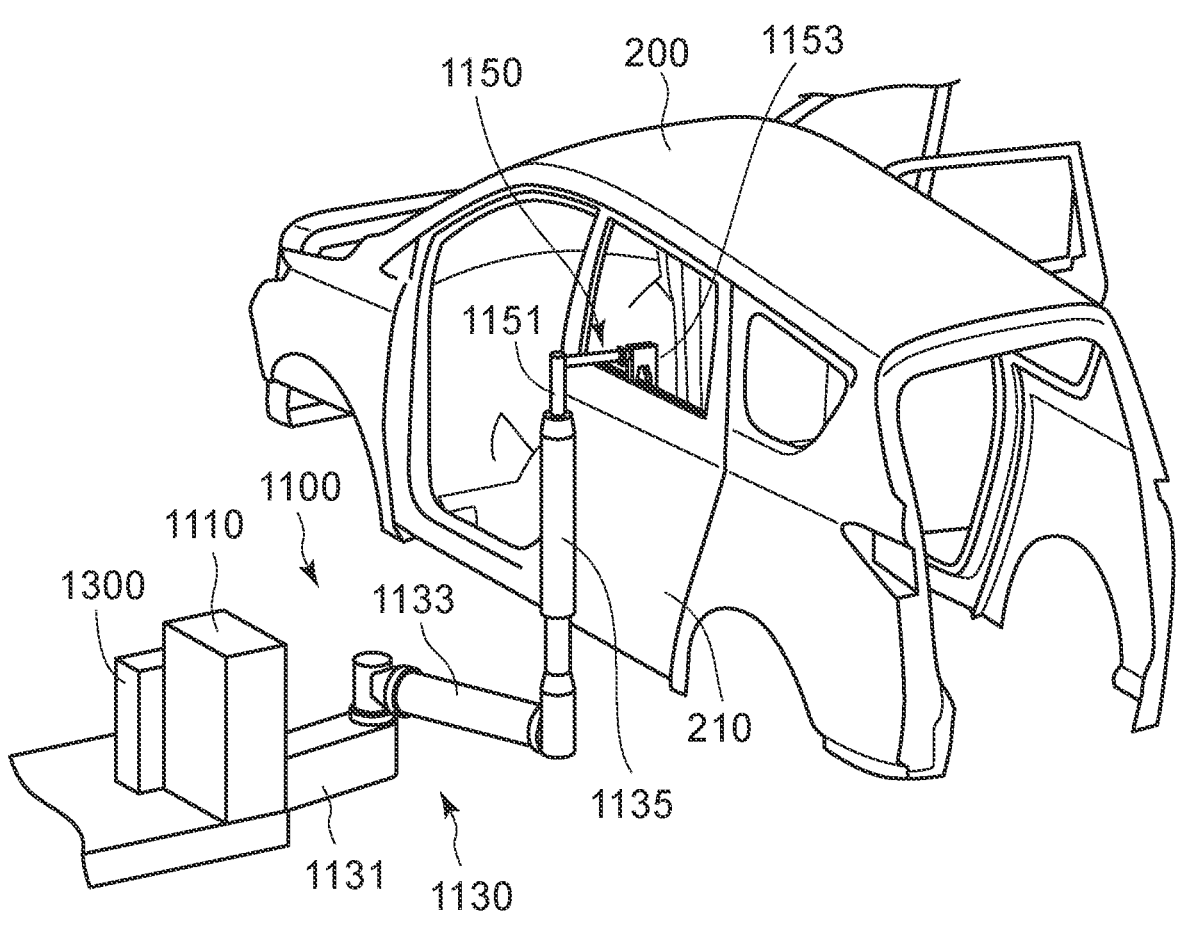
FIG. 12 is a perspective view illustrating a door opening/closing robot according to one or more embodiments.

FIG. 12 is a perspective view illustrating a door opening/closing robot 1100 according to one or more embodiments. The door opening/closing robot 1100 illustrated in FIG. 12 is particularly described as an example of a door opening/closing robot with horizontally articulated used in a coating line for the automobile body 200. However, a door opening/closing robot according to one or more embodiments is not limited to a coating line of an automobile body, but can be applied to any technology for opening and closing a door using a robot. As illustrated in FIG. 12, the automobile body 200 is transported by a conveyor system. The door opening/closing robot 1100 is provided in a position to open and close the door 210 of the automobile body 200. The coating line may be provided with a coating robot, which is not illustrated in the figure, and the automobile body 200 may be coated by a paint spurting from a coating gun mounted on the coating robot.

The door opening/closing robot 1100 includes a base 1110, a robot arm 1130 that is movably connected to the base 1110, and a door operating tool 1150 that is movably connected to the robot arm 1130. The base 1110 may be fixedly installed on a floor where the door opening/closing robot 1100 is installed. The base 1110 may be mounted on a cart traveling on a rail that runs parallel to the conveyor system. The robot arm 1130 includes a first link 1131 that is movably connected to the base 1110, a second link 1133 that is movably connected to the first link 1131, and a third link 1135 that is movably connected to the second link 1133. The first link 1131 may be connected to the base 1110 and move around a rotation axis of the first link 1131. The second link 1133 may be connected to the first link 1131 and move around the rotation axis of the second link 1133. The third link 1135 may be connected to the second link 1133 and move around the rotation axis of the third link 1133. The door operating tool 1150 includes a tool adapter 1151 that is movably connected to the third link 1135 and a tool 1153 that is connected to the tool adapter 1151. The door operating tool 1150 is movably connected to an end of the third link 1135 in a vertical direction. The door operating tool 1150 is rotatably connected to the third link 1133. The robot arm 1130 according to one or more embodiments may be a 3-axis horizontal articulated robot arm. A robot arm according to one or more embodiments is not limited to this, and may be a horizontal articulated robotic arm with 2 axis, 4 axis, 5 axis, 6 axis, 7 axis, etc.

The door opening/closing robot 1100 receives a control signal from a controller 1300 and performs an operation of the robot arm 1130. The controller 1300, while sending a control signal to the door opening/closing robot 1100 and performing a position control of the door operating tool

1150, opens and closes the door 210 using the door operating tool 1150. For example, in FIG. 12, the controller 1300 is provided near the door opening/closing robot 1100, but it is not limited to this. For example, the controller 1300 may be outside a coating line or outside a factory where the coating line is installed. The controller 1300 needs only to be able to send a control signal to the door opening/closing robot 1100, for example, via the internet.

Figure 13:
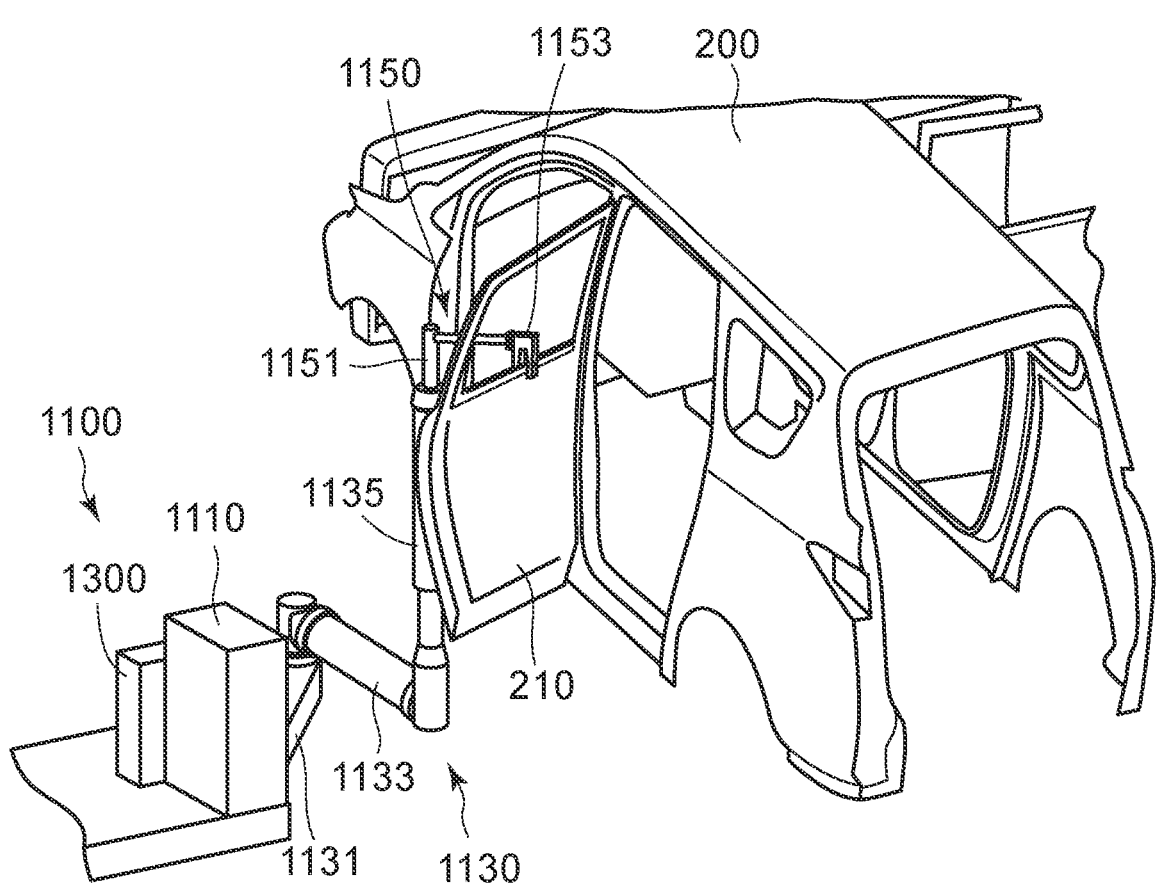
FIG. 13 is a diagram illustrating a state in which the door opening/closing robot according to one or more embodiments opens and closes a door of a car.

FIG. 13 is a perspective view illustrating the door opening/closing robot 1100 according to one or more embodiments. In particular, FIG. 13 illustrates a state in which the door 210 of the automobile body 200 is opened by the door opening/closing robot 1100. The door opening/closing robot 1100 is controlled in operation by the controller 1300, performs a position control of the door operating tool 1150 connected to the robot arm 1130, performs a presence detection of the door 210 of the automobile body 200, and opens the door when the presence of the door is recognized.

In FIG. 12 and FIG. 13, the door opening/closing robot 1100 with horizontally articulated is illustrated, but for the presence detection of a door, the flowchart in FIG. 5 can be used. That is, at step S310, the door operating tool 1150 is lowered and moved to a position where the door operating tool 1150 and the door 210 are about to contact. This position is designated as a teaching point A. The torque to rotate the door operating tool 1150 at this point is designated as a torque A. Next, the door operating tool 1150 is lowered further from the teaching point A to bring the door operating tool 1150 into contact with the door 210. After bringing the door operating tool 1150 into contact with the door 210, the door operating tool 1150 is further lowered by a predetermined angle. This position is designated as a teaching point B. At the teaching point B, the door operating tool 1150 and the door 210 contact each other, and a force such that the door operating tool 1150 pushes the door 210 is needed. As a result, a current value of a motor pertaining to the door operating tool 1150 increases, and the restraining torque of the motor increases. The torque to rotate the door operating tool 1150 at this point is designated as a torque B. As described above, by detecting the torque pertaining to the position where the door operating tool 1150 and the door 210 are about to contact (torque A) and the torque pertaining to the position where the door operating tool 1150 is lowered further after the door operating tool 1150 contacts the door 210 (torque B) and by detecting a change between these torque A and torque B, the presence of the door 210 can be detected. The change between the torque A and the torque B can be detected by, for example, taking the difference between the two torques. The change in torque can be detected, for example, by detecting a change in the current value of the motor pertaining to the door operating tool 1150.

Thus, a door opening/closing robot according to one or more embodiments can be applied to a door opening/closing robot that includes a horizontally articulated robot arm.

In the door opening/closing robot according to one or more embodiments described above, a door to be detected presence is a door that opens and closes, but is not limited this, and in the one or more embodiments, a sliding door can also be applied. Also, the door opening/closing robot according to one or more embodiments described can also be applied to a vertically articulated door opening/closing robot and a horizontally articulated door opening/closing robot.

In the related art, when performing a presence detection of a door of a door opening/closing robot, a fiber sensor, etc. is used to detect. The door presence detection using a sensor requires a sensor to be installed near the tip of the robot arm, which requires wiring. An area near the tip of the robot arm usually has a large amount of movement, and increased wiring results in an increase in the number of components, which reduces both cost effectiveness and maintainability. A door opening/closing robot according to one or more embodiments detects the presence of a door by detecting a change in torque of a motor used to rotate a door operating tool. As a result, a sensor for door presence detection is not required, thereby reducing costs. In addition, because a robot performs repetitive movements in continuous production, a sensor and wiring rigged to the robot move with the robot. A moving part is subject to wear out, which means that regular maintenance is required. In a door opening/closing robot according to one or more embodiments, since a sensor for door presence is not required, the number of parts such as a sensor and wiring can be reduced. As a result, maintainability improves.

One or more embodiments described above in the specification may be combined with one another to the extent feasible within the scope of the intended embodiment. The above-described embodiment should be considered exemplary in all respects and not limiting. The illustrated and described embodiment may be extended to encompass other embodiments in addition to those specifically described without departing from the intended scope of the invention. The scope of the invention should be determined by the claims in light of the specification, including equivalents, and not solely by the foregoing description. Thus, all configurations, including configurations included in the equivalent scope of the claims, are intended to be included in the invention. Therefore, all configurations, including configurations included in the equal construction of the claims, are intended to be included in the invention.

The invention claimed is:

1. A robot that opens and closes a door comprising:
a base;
a robot arm connected to the base comprising;
    a multi-link arm rotatable about a plurality of rotation axes associated with a plurality of links; and
    a driver that rotates the arm; and
a door operating tool connected to a tip end link of the plurality of links of the arm and moving with a rotation of the tip end link of the arm around one of the plurality of rotation axes, wherein
the robot arm drives the driver to rotate the door operating tool and detects a presence of the door based on a change in torque of a motor,
detecting the presence of the door comprises detecting whether the door is in a correct position for the door operating tool by rotating the tip end link of the arm about the one of the plurality of rotation axes corresponding thereto, and detecting the change in torque of the motor based on the rotation of the tip end link.

2. The door opening and closing robot according to claim 1, wherein
the driver comprises the motor.

3. The door opening and closing robot according to claim 2, wherein
the robot arm rotates a door operating tool by driving the motor and detects presence of the door based on a current of the motor.

4. The door opening and closing robot according to claim 1, wherein
the door operating tool comprises:
    an arm connection portion connected to the robot arm;
    a first projection portion provided at a predetermined distance from the arm connection portion;

a second projection portion provided at a predetermined distance from the first projection portion; and
    a tool arm that connects the first projection portion to the arm connection portion.

5. The door opening and closing robot according to claim 4, wherein
the tool arm extends perpendicular to a flange surface of the arm connection portion.

6. The door opening and closing robot according to claim 4, wherein
the robot arm rotates a door operating tool by driving the motor, contacts a door with a concave portion between the first projection portion and the second projection portion, and detects presence of the door based on a change in torque of the motor.

7. The door opening and closing robot according to claim 4, wherein
the first projection portion is longer than the second projection portion.

8. The door opening and closing robot according to claim 4, wherein
the second projection portion has a tapered shape toward a tip.

9. The door opening and closing robot according to claim 1, wherein
the plurality of links comprises 6 links, and
the plurality of rotation axes comprises 6 rotation axes.

10. A method of opening and closing a door using a door opening and closing robot comprising:
in response to receiving an instruction of door opening, moving a multi-link robot arm of the door opening and closing robot to an opening position of the door, the robot arm rotatable about a plurality of rotation axes associated with a plurality of links;
rotating a door operating tool connected to a tip end link of the plurality of links of the robot arm by a motor;
detecting a change in torque of the motor by rotating the door operating tool and detecting the change in torque of the motor based on the rotation;
recognizing presence of a door when a change in torque is detected by detecting whether the door is in a correct position for the door operating tool by rotating the tip end link of the arm about the one of the plurality of rotation axes corresponding thereto, and detecting the change in torque of the motor based on the rotation of the tip end link; and
in response to the recognition of the presence of the door in the correct position for the door operating tool, performing a door opening operation.

11. The method of opening and closing a door using a door opening and closing robot according to claim 10, wherein
the detecting the change in torque of the motor comprises detecting a change in a current of the motor.

12. The method of opening and closing a door using a door opening and closing robot according to claim 10, wherein
the detecting the change in torque of the motor comprises:
detecting a first torque of the motor when a robot arm of the door opening and closing robot moves to an opening position of the door;
detecting a second torque of the motor when the door operating tool is further rotated by a predetermined angle after contacting the door operating tool with the door; and
detecting a change in torque of the motor based on the first torque and the second torque.

13. The method of opening and closing a door using a door opening and closing robot according to claim 12, wherein the detecting the change in the first torque of the motor comprises detecting a change in a current of the motor.

14. The method of opening and closing a door using a door opening and closing robot according to claim 12, wherein the detecting the change in the second torque of the motor comprises detecting a change in a current of the motor.

15. The method of opening and closing a door using a door opening and closing robot according to claim 9, wherein the plurality of links comprises 6 links, and the plurality of rotation axes comprises 6 rotation axes.

* * * * *